(12) United States Patent
Dean et al.

(10) Patent No.: US 8,963,709 B2
(45) Date of Patent: Feb. 24, 2015

(54) MEDIA MANAGEMENT IN A SECURITY SYSTEM

(75) Inventors: Lance Leo Dean, Colleyville, TX (US); Todd Santiago, Provo, UT (US)

(73) Assignee: Linear LLC, Carlsbad, CA (US)

( * ) Notice: Subject to any disclaimer, the term of this patent is extended or adjusted under 35 U.S.C. 154(b) by 0 days.

(21) Appl. No.: 13/592,186

(22) Filed: Aug. 22, 2012

(65) Prior Publication Data

US 2013/0049960 A1 Feb. 28, 2013

Related U.S. Application Data

(60) Provisional application No. 61/526,167, filed on Aug. 22, 2011.

(51) Int. Cl.
*G08B 21/00* (2006.01)
*H04M 11/04* (2006.01)

(52) U.S. Cl.
CPC .................. *H04M 11/045* (2013.01)
USPC .......................................... 340/540; 340/541

(58) Field of Classification Search
USPC .................................................. 340/540, 541
See application file for complete search history.

(56) References Cited

U.S. PATENT DOCUMENTS

| | | | |
|---|---|---|---|
| 6,400,265 B1 | 6/2002 | Saylor et al. | |
| 7,786,891 B2* | 8/2010 | Owens et al. | 340/541 |
| 8,456,293 B1* | 6/2013 | Trundle et al. | 340/517 |
| 8,537,003 B2* | 9/2013 | Khachaturov et al. | 340/540 |
| 2003/0151507 A1* | 8/2003 | Andre et al. | 340/539.13 |
| 2005/0010473 A1 | 1/2005 | McLaughlin | |
| 2005/0088313 A1* | 4/2005 | LeBlanc et al. | 340/825.24 |
| 2010/0134299 A1* | 6/2010 | Fitzgerald et al. | 340/573.1 |
| 2010/0277315 A1* | 11/2010 | Cohn et al. | 340/540 |
| 2011/0029875 A1* | 2/2011 | Milch | 715/727 |

OTHER PUBLICATIONS

International Searching Authority, United State Patent and Trademark Office, "International Search Report and Written Opinion", mailed Nov. 16, 2012, in related PCT application No. PCT/US2012/051926.
"New Zealand Application Serial No. 622382, First Examination Report mailed Jul. 18, 2014", 2 pgs.

* cited by examiner

*Primary Examiner* — Eric M Blount
(74) *Attorney, Agent, or Firm* — Schwegman Lundberg & Woessner, P.A.

(57) ABSTRACT

The present invention extends to methods, devices, systems, and computer program products for media management in a security system. A method may comprise receiving media and assigning the received media to an alarm zone of a security system. The method may further include detecting activation of the alarm zone and conveying the media in response to detecting activation of the alarm zone.

20 Claims, 8 Drawing Sheets

MEDIA MANAGEMENT IN A SECURITY SYSTEM

CROSS-REFERENCE TO RELATED APPLICATION

The present Application for Patent claims the benefit of priority under 35 U.S.C. §119(e) to U.S. Provisional Application Ser. No. 61/526,167, entitled "MEDIA DELIVERY AND MANAGEMENT THROUGH A SECURITY SYSTEM," filed Aug. 22, 2011, assigned to the assignee hereof, and expressly incorporated herein in its entirety by this reference.

TECHNICAL FIELD

This disclosure relates generally to security systems. More specifically, the present disclosure relates to systems, devices, methods, and computer-readable media for delivering media to and managing media in a security system.

BACKGROUND OF RELATED ART

Computer systems and related technology affect many aspects of society. Indeed, a computer system's ability to process information has transformed the way we live and work. Computer systems now commonly perform a host of tasks (e.g., word processing, scheduling, accounting, etc.) that, prior to the advent of computers, were performed manually. More recently, computer systems have been coupled to one another and to other electronic devices to form both wired and wireless computer networks over which the computer systems and other electronic devices can transfer electronic data. These networks enable the performance of many computing tasks to be distributed across a number of different computer systems and/or a number of different computing environments.

In some environments, media is delivered from one computer system to another computer system over a computer network. Some media, for example, music, ring tones, images, video, books, etc., must be purchased before they are delivered. Other media, including coupons, as well as some music, ring tones, images, video, books and the like may be free, and can be delivered without purchase. Media may be delivered to and managed at personal computers, laptops, mobile phones, PDAs, etc.

SUMMARY

A security system according to the present disclosure includes a security system controller, which may also be referred to more simply as a "controller" and is referred to in the art as a "control panel" and as a "panel," and one or more zones (e.g., door sensors, window sensors, motion sensors, etc.), which may also be referred to herein as "alarm zones." The security system controller includes a zone configuration module, which may be configured to receive and store media and assign the media to one or more zones of the security system. The security system controller may also include a user interface, which may be configured to display options for media that may be obtained by a user (e.g., a homeowner, an occupant, etc.), to enable the user to cause the security system controller to obtain selected media, and to convey the selected media to one or more zones of the security system. In some embodiments, the media options that are presented to the user may correspond to a particular zone, and may be delivered in response to an event at the zone. For example, media that corresponds to home improvement, gardening, automotive needs, or the like may be delivered in response to a threshold level of activity at a door to a garage, storage shed or workshop. As another example, media that corresponds to outdoor entertainment, such as a barbeque, swimming, or the like, may be delivered in response to activity at a door to a deck or patio or in response to a gate or motion at a swimming pool. In some embodiments, the presentation of media options may be triggered when the activity occurs at a predetermined time. Media options may be presented in response to any activity; however, a threshold level of activity (e.g., within a predetermined period of time, etc.) may be required in some embodiments.

In a specific embodiment, in addition to a security system controller, a security system may include a media system. The security system controller may include a zone configuration module, which may be configured to assign media to one or more zones, and a user-interface, which may be configured to convey media associated with a zone in response to an event at the zone. The media system may be configured to receive and manage media, and to transfer media to one or more zones.

In some embodiments, the security system may also include one or more remote control devices. Without limitation, a remote control device may comprise a portable computing device, such as a smart phone or a tablet computer, that provides an additional user interface for selecting and managing media. The remote control device, which may communicate with the security system controller, may enable a user to view media options that have been made available to the user through the security system controller, to select from those media options, and/or to manage media, including its delivery to one or more zones.

In another aspect, this disclosure relates to methods for delivering media to potential consumers. Such a method may enable a potential customer (e.g., a homeowner, etc.) to opt into or opt out of receiving media options (e.g., audible signals, such as ring tones or the like for one or more zones; coupons; etc.). Media options may be presented to a user in response to activity at one or more zones. Presentation of the media options may be effected by way of a network operations center (NOC), which may deliver the media options to a security system controller, or panel, that may be accessed by the user. In some embodiments, the media options that are presented may be a may be delivered in response to activity at one or more zones of a security system.

Of course, methods of operating a security system are also within the scope of the present disclosure. Such a method may include accessing a list of audible signals, which are also referred to herein as "ring tones" (even though they may comprise music, spoken words, or the like) or "sounds," at a remote system and receiving one or more ring tones from the list of ring tones at a security system. The method may also include updating a zone configuration to assign a ring tone of the one or more received ring tones to a zone monitored by the security system. Further, the method may include detecting activation of the zone subsequent to assigning the ring tone to the alarm zone and conveying the ring tone in response to detecting activation of the alarm zone.

In another specific embodiment, a method may include presenting a customized set of one or more coupons at a security system and receiving a coupon selection from among the one or more coupons. In addition, the method may include sending the coupon selection to a remote system as appropriate in response to the coupon selection and receiving an electronic message indicative of the coupon selection and including a link to the coupon at the remote system.

Another method, according to a specific embodiment, may include assigning media to an alarm zone of a plurality of alarm zones within a security system. Additionally, the method may include detecting activation of the alarm zone and conveying the media in response to detecting activation of the alarm zone.

Another method, according to another embodiment, may comprise receiving user-entered media at a security system updating a zone configuration to assign the user-entered media to an alarm zone monitored by the security system. Moreover, the method may include detecting activation of the alarm zone subsequent to assigning the user-entered media to the alarm zone and conveying the user-entered media in response to detecting activation of the alarm zone.

Yet another embodiment of the present disclosure comprises a computer-readable media storage storing instructions that when executed by a processor cause the processor to perform instructions in accordance with one or more embodiments described herein.

Other aspects, as well as features and advantages of various aspects, of the disclosed subject matter will become apparent to those of skill in the art though consideration of the ensuing description, the accompanying drawings and the appended claims.

BRIEF DESCRIPTION OF THE DRAWINGS

In order to describe the manner in which the above-recited and other advantages and features of the disclosure can be obtained, a more particular description of the disclosed subject matter briefly described above will be rendered by reference to specific embodiments thereof which are illustrated in the appended drawings. Understanding that these drawings depict only some embodiments of the disclosed subject matter and are not, therefore, to be considered limiting in scope, the subject matter will be described and explained with additional specificity and detail through the use of the accompanying drawings, in which.

DETAILED DESCRIPTION

The present disclosure extends to methods, devices, systems, and computer program products for managing media in a security system.

Embodiments of the present disclosure may comprise or utilize a special purpose or general-purpose computer including computer hardware, such as one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general purpose or special purpose computer system. Non-transitory computer-readable media that store computer-executable instructions are computer storage media (devices).

Computer storage media (devices) include RAM, ROM, EEPROM, CDROM, solid state drives ("SSDs") (e.g., based on RAM, etc.), Flash memory, phase change memory ("peM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (e.g., hardwired, wireless, a combination of hardwired or wireless, etc.) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC", etc.), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosed subject matter may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, alarm system control panels, home automation control panels, and the like. The disclosed subject matter may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Accordingly, a computer architecture can include computer systems that connect to one another over (or are part of) a network, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), User Datagram Protocol ("UDP"), Hypertext Transfer Protocol ("HTTP"), Simple Mail Transfer Protocol ("SMTP"), Short Message Service ("SMS"), Multimedia Messaging Service ("MMS"), etc.) over the network.

Figure 1A:
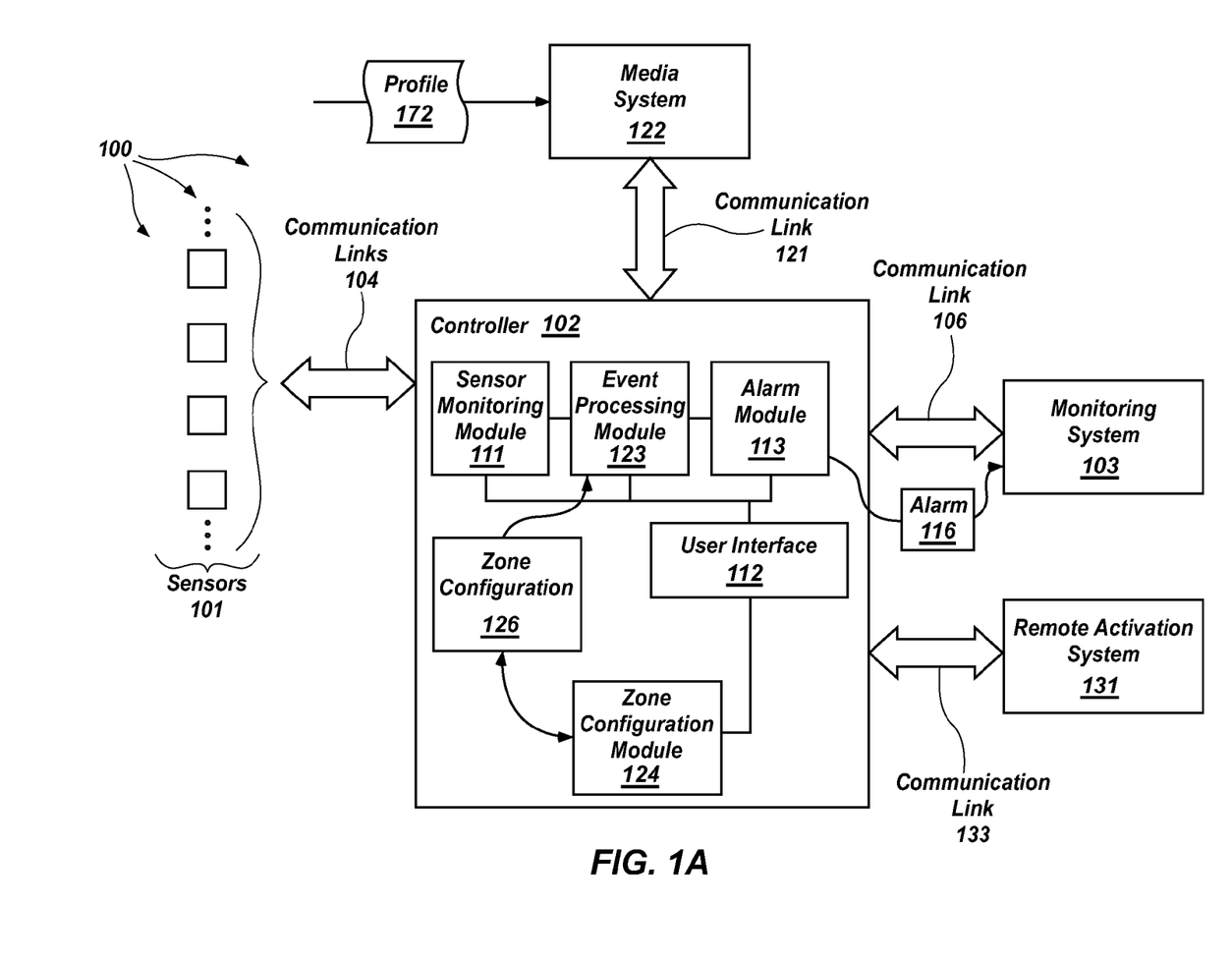
FIG. 1A illustrates an embodiment of a security system configured for managing media.

FIG. 1A illustrates a security system 100, according to one embodiment of the present disclosure. As depicted, security system 100 includes one or more sensors 101, a controller 102, or panel, a monitoring system 103, a remote activation system 131, and a media system 122. Communication links 104 connect sensors 101 to controller 102. Communication link 121 connects controller 102 to media system 122. Communication link 106 connects controller 102 to monitoring system 103. Further, communication link 133 connects remote activation system 131 to controller 102, either indirectly through the monitoring system 103 or directly (as shown). It is noted that the communication links of security system 100 may comprise, for example, wired telephone connections, wired network connection, wireless network connections, cellular connections, or a combination thereof. According to some embodiments, sensors 101 and controller 102 are located on the same premises, for example, in the same residence or in the same building.

Generally, sensors 101 include any of a variety of different types of sensors, such as, door and window sensors (e.g., normally closed sensors, etc.), motion sensors (e.g., passive infrared (PIR) sensors, glass break sensors (e.g., sensors configured for detecting a physical break or detecting the sound of a glass break), etc.), etc. Controller 102 may be configured to monitor sensors 101 for alarm conditions via communication links 104 and relay alarms to monitoring system 103 via communication link 106.

Controller 102 includes a sensor monitoring module 111, an event processing module 123, a user interface 112, an alarm module 113, zone configuration 126, and a zone configuration module 124. Sensor monitoring module 111 may be configured to monitor sensors 101. Sensors 101 are configured to sense and/or indicate a change in their physical surroundings (e.g., sensing a closed connection becoming open, detecting the sound of breaking glass, etc), which may be indicative of access, either authorized or unauthorized, on communication links 104. For example, a circuit connected to a door sensor can transition from a closed state to an open state (or at least to a resistance exceeding a pre-determined resistance threshold) indicating that a door has been opened. As another example, a motion sensor can send an electrical signal indicative of detected motion. Sensor monitoring module 111 is configured to monitor communication links 104 for indications sent from sensors 101.

Upon sensor monitoring module 111 receiving an indication of a change in physical surroundings (i.e., an event trigger), sensor monitoring module 111 may send an indication (i.e., a signal) to event processing module 123. Event processing module 123 may process the indication or signal to, among other things, detect if the indication is indicative of an alarm condition. An alarm condition can be detected when controller 102 has been configured to monitor for alarms (e.g., turning an alarm system "ON" when leaving the premises, etc.). Alternatively, an alarm condition may not be detected when controller 102 is not configured to monitor for alarms (e.g., turning an alarm system "OFF" when entering premises, etc.). When an alarm condition is detected, alarm module 113 may be made aware of the alarm condition. Alarm module 113 can, in turn, send the alarm condition, for example, alarm 116, to monitoring system 103.

Zone configuration module 124 can be used to create and modify a zone configuration 126, including assigning different media (e.g., ring tones, coupons, etc.) to different alarm zones. Ring tones, which may comprise one or more sound files, can be custom tones (e.g., songs, chimes, spoken words, etc.) or tones that are downloaded to controller 102. Ring tones can provide unique sounds per zone or alarm conditions (e.g., fire, panic, alarm, etc.). Ring tones can be used to supplement the preprogrammed, or standard, beeps or tones of a security controller. It is noted that the term "ring tone" may include voice signals. It is further noted that the term "coupon," as used herein may also include and may be referred to as a "coupon offer."

User interface 112 can include an input interface and an output interface (not shown in FIG. 1A). The input interface can be a physical input interface or virtual input interface that includes one or more numeric key pads (e.g., for programming controller 102, for entering a disarm code, etc.), sensor activation buttons, physical duress buttons, etc. The input interface can also include a condenser for receiving audio input, communicating with monitoring system 103, or both.

The output interface includes an output display device configured to display system status, such as armed, disarmed, sensors/zones that have detected change in physical surroundings, etc. The output display device may be a color display device. The output display device may display other information, such as a list of available coupons, weather information, news, stock quotes, or the like. The output interface can also include one or more speakers that audibly output information. Audible outputs can include ring tones, such as beeps, chimes, songs, spoken words, etc. In some embodiments, a touch screen (e.g., a color touch screen, etc.) may function as part of both an input interface and an output interface.

User interface 112 may be configured to arm or disarm security system 100. When disarmed, alarm module 113 may not treat monitored indications or signals from sensors as alarm conditions. For example, when disarmed, alarm module 113 may not consider detecting a door opening or detecting motion as an alarm condition. However, alarm module 113 can provide a status message, for example, an audible beep, ring tone, or a text or audio message indicating that a door or window has been opened. When armed, alarm module 113 may consider indications and signals from sensors as alarm conditions. Upon receiving a detected indication or signal from a sensor, alarm module 113 may delay some amount of time before registering an alarm condition as an alarm. For example, upon detecting that a door has been opened, there may be some delay to permit entering of a disarm code.

Security system 100 may also include continuous (e.g. "24-hour") monitoring zones, for example, a gun cabinet or a smoke detector. Continuous monitoring zones continue to be monitored and may signal alarm conditions even when the alarm system is disarmed.

When an alarm is registered, an audible indicator of the alarm (e.g., a ring tone, etc.) can be output by a speaker. Additionally, an alarm message, such as alarm 116 may be sent to monitoring system 103. An operator at monitoring system 103 can review alarm 116 and respond as appropriate. If equipment permits, an operator at monitoring system 103 may also speak to an end-user positioned proximate user interface 112 through "two-way voice" functionality directly through the speaker. The operator can also attempt to contact the owners or other authorized contacts of the monitored premises, alert fire, medical, or law enforcement personnel, dispatch a private security guard to investigate, or take other action in response to an alarm.

As noted above, communication link 133 connects controller 102 and remote activation system 131. For example, communication link 133 can be a network link between controller 102 (e.g., through monitoring system 103, directly, etc.) and remote activation system 131. An authorized user can access remote activation system 131 and interact remotely (e.g., through a web-based interface, a mobile device application, etc.) with controller 102. Through remote interaction, many of the functions performable through user interface 112 (e.g., monitoring, arming, disarming, etc.) can also be performed remotely.

Figure 1B:
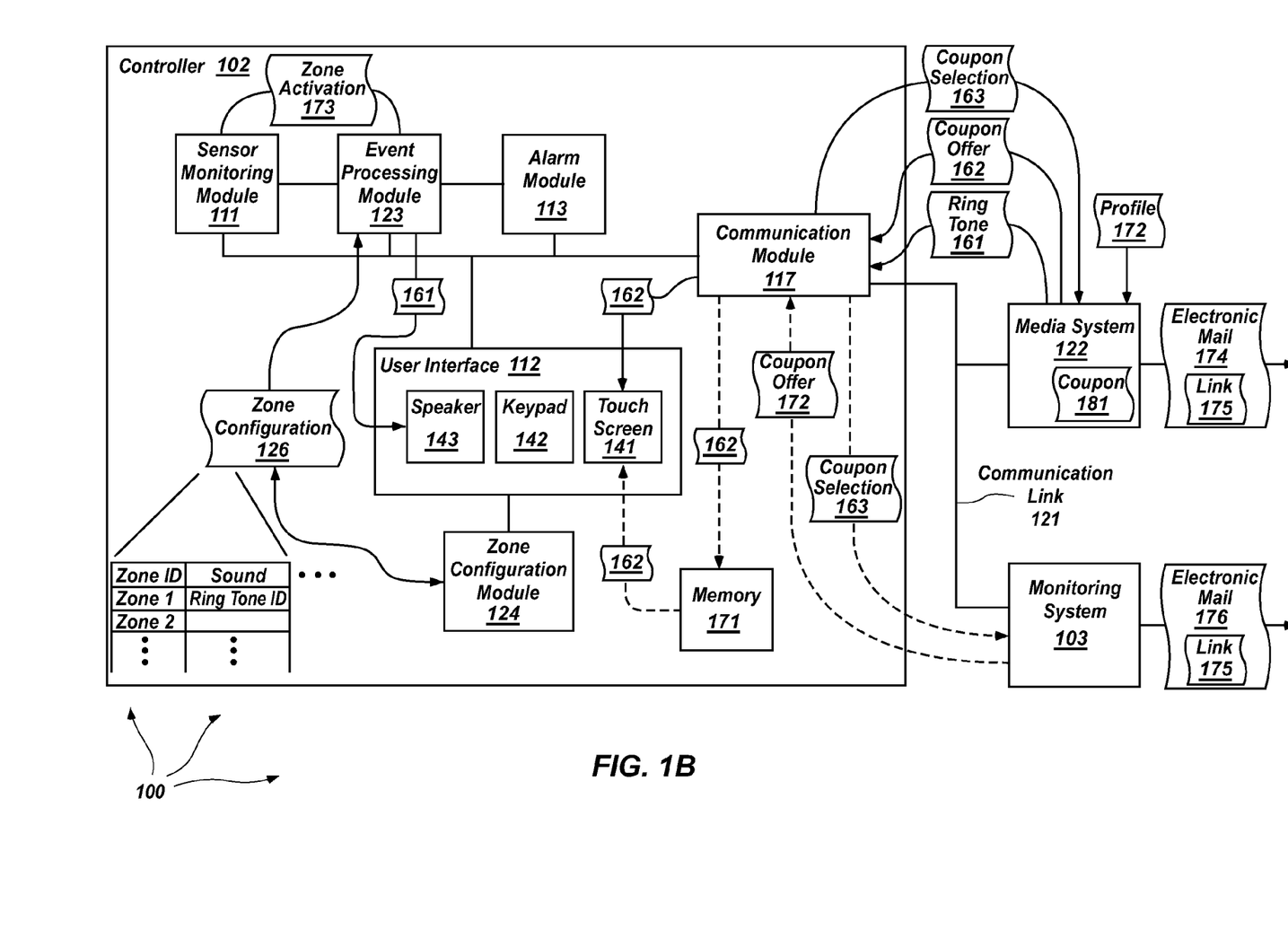
FIG. 1B is a more detailed illustration of an embodiment of a security system for managing media in a security system.

FIG. 1B is a more detailed view of security system 100, according to an embodiment of the present disclosure. As depicted in FIG. 1B, controller 102 includes a communication module 117 and memory 171. Also, as depicted, user interface 112 includes a speaker 143, a keypad 142, and a touch screen 141. Further, communication link 121, which may comprise, for example, a wired telephone connection, wired or wireless network connection, cellular connection (e.g., GSM radio, etc.), or a combination thereof, connects controller 102 to media system 122 and monitoring system 103. Communication link 121 can include or be a part of communication link 106 (see FIG. 4).

Controller 102 can access media, such as ring tones, coupons, etc., via media system 122, monitoring system 103, or both. Further, as described more fully below, controller 102 may receive user-entered media, such as, by way of example only, a text-based message, a voice message or a sound, via user interface 112. In some embodiments, media system 122 and monitoring system 103 are under the control of a single entity and/or are included in the same backend system. In such embodiments, media system 122 may be separate from monitoring system 103 or it may comprise a part of monitoring system 103. Media system 122 may utilize a profile 172 that corresponds to a particular security system 100, and which may be defined by a security provider, by an installer, by a user or in any other appropriate way, to customize media for delivery to controller 102. Profile 172 can include information related to an owner of security system 100 to qualify the owner for purchase of security system components and installation. For example, profile 172 can include billing information, location, credit score, "preference" selections (i.e., the type of coupon offers the user is interested in), etc. As will be appreciated by a person of ordinary skill in the art, a remote service, such as media system 122 or monitoring system 103, may use the user information for targeted advertising, which can be sold and displayed via user interface 112. In addition to receiving coupon offer 162, controller 102 may receive a reminder to view coupon offer 162.

In some embodiments, media system 122 may send coupon offers 162 to controller 102. A user (e.g., an owner of security system 100, an occupant of the premises where security system 100 has been installed, etc.) can select, via user interface 112, a coupon offer. In response to selection of a coupon, controller 102 may send a coupon selection 163 back to media system 122. Media system 122 may then send an electronic mail message 174 to an electronic mail account associated with a user of controller 102. Electronic mail message 174 can include a link 175 (e.g., a hyperlink, etc.) to a full representation of the coupon at media system 122. The user can then select link 175 to access the full representation of coupon 181. The user can then print the full representation of coupon 181, copy/download the full representation of coupon 181 to a handheld device, or both. Coupon 181 can subsequently be displayed to a merchant via the printed coupon or via the handheld device.

Alternatively, monitoring system 103 may send coupon offers 162 to controller 102. A user can select, via user interface 112, coupon offer 162. In response, controller 102 may send a coupon selection 163 to monitoring system 103. Monitoring system 103 may then send electronic message 174 (e.g., an e-mail, a text message (e.g., MMS, SMS, etc.), etc.) to an account (e.g., an e-mail account, a mobile phone number, etc.) associated with a user of controller 102. Electronic message 174 can include a link 175 back to a full representation of coupon 181 at media system 122. The user can then select link 175 to access the full representation of coupon 181. The user may then print the full representation of coupon 181, copy/download the full representation of coupon 181 to a handheld device, or both. Coupon 181 may be subsequently displayed to a merchant via the printed coupon or via the handheld device. It is noted that monitoring system 103 and media system 122 may communicate as appropriate over communication link 121 to supply coupon offers 162 and ring tones 161 to controller 102.

Thus, generally, controller 102 may be configured to receive ring tones 161, coupon offers 162, or both, via communication link 121 at communication module 117. Communication module 117 can include a Global System for Mobile Communications ("GSM") radio or other communication component that facilitates wireless communication or other suitable communication component (e.g. a wired communication component, etc.). Received ring tones 161 and coupon offers 162 can be stored in memory 171.

Zone configuration 126 can include data structures for each alarm zone indicating various characteristics of the alarm zone. The data structure may include a field for ring tone, which links to a sound file for emitting a ring tone at speaker 143. The data structure may also include a field for coupons, which links to coupons and/or coupon offers to be presented via user interface 112. As such, each alarm zone may be individually configured with specific and potentially different ring tones and specific and potentially different coupons. For example, different media (e.g., ring tones, coupons, etc.) may be assigned to different doors (e.g., a front door, a back door, etc.). When the front door is open, one ring tone can sound, and when the back door is opened, a different ring tone can sound. Similarly, when the front door is open, one set of coupon offers can be presented and when the back door is opened, a different set of coupon offers can be presented.

Accordingly, a user can select, via user interface 112, different ring tones for different zones. Available ring tones can be displayed on touch screen 141 in a drop down list. Further, users may be able to select a time duration for a ring tone. For example, a user may choose to program a door leading to the backyard having a swimming pool to play a different sound then the front door, and for a longer duration. Controller 102 may also be configured to display a global chime "on and off button" on touch screen 141 to enable a user to disable the chime feature globally and then re-enable it with one click.

Coupon offers 162 can be received via wireless communication between controller 102 and media system 122, monitoring system 103, or both, prior to presenting the customized set of one or more coupon offers at user interface 112. Received coupon offers 162 can be stored in memory 171. In some embodiments, when a specified alarm zone is activated, coupon offers 162 may be presented. For example, when an entry door is activated, there is a higher probability of a user viewing controller 102 (e.g., to deactivate the security system, to perform a status check, etc) then when a window sensor or an interior sensor is triggered. Accordingly, coupons offers 162 can be presented in response to detecting a door open to provide a higher chance of the user viewing coupon offers 162.

As noted above, profile 172 may include user information, such as billing information, location, credit score, etc. Accordingly, financial transactions may be initiated and completed via user interface 112. Stated another way, a user (i.e., potential consumer) can select, agree to, and/or purchase offerings (e.g., coupons, ring tones, etc.) via user interface 112. Further, purchases made via user interface 112 may be automatically included in a customer's bill. Purchases (e.g., ring tones, etc.) may be incorporated into a notification for a particular door. Further, a user may select categories of interest to filter the types of offers to be received. This can be done via user interface 112 or an associated website. Offerings (e.g., ring tones, coupons, etc.) can be presented on user interface 112 according to these preferences. Users can choose to have a specific offer emailed to them to be printed and redeemed. Offers can also be sent directly to a user's cell phones via a text message (e.g., MMS, SMS, etc.). Further, it is noted that each time a user selects a coupon offer, a maximum savings amount of a particular coupon may be added to a year to date (YTD) savings display/calculator, which may be accessible via user interface 112.

According to another embodiment of the present disclosure, controller 102 may include an embedded GSM radio or other suitable communication component to enable messaging of coupon offers from a remote server (e.g., database, etc.) directly to user interface 112. It is noted that a "flashable" touch screen with constant connectivity via a GSM radio may enable for frequent updates with current and relevant offers. It is further noted that media system 122 may be configured to convey information to user interface 112 via a cellular radio. Further, in addition to coupons 181, ring tones 161, and the like, media system 122 may convey information which the end user chooses to have sent to them via the web-portal, or it can be information related to a new feature available for download, a weather warning, an amber alert, bill notice, energy cost information, etc.

Accordingly, user interface 112 facilitates the control of display, sounds, voice prompts spoken from local vocabulary, and length of time or action that causes the information to be removed from the display. It is possible that the interaction of the display and the user is interactive. Thus, the display prompts for information and the user response is sent back, etc. The security system can retain priority of the display in the case of a security condition.

Figure 2:
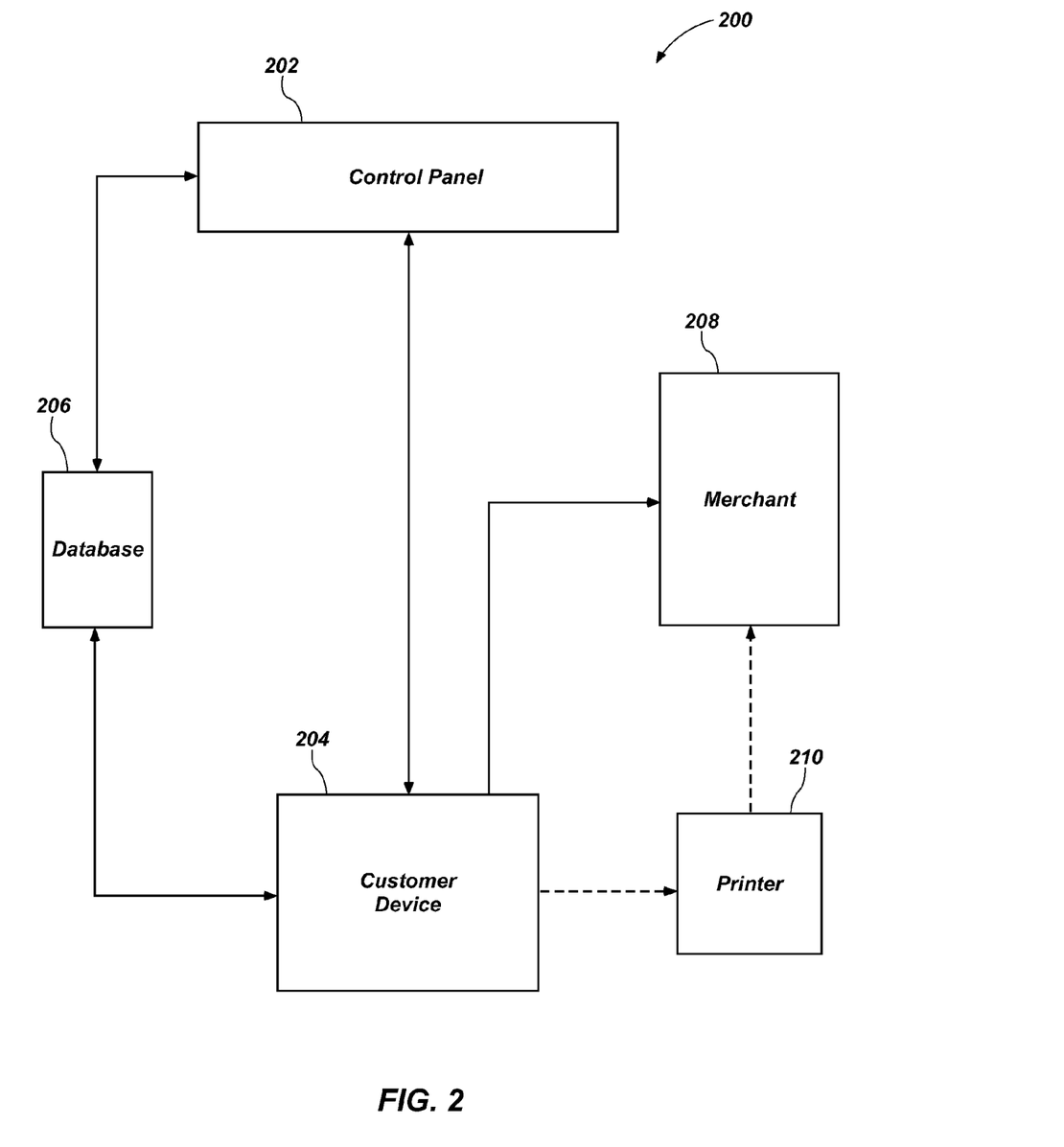
FIG. 2 illustrates an embodiment of a security system for redeeming a coupon.

FIG. 2 illustrates a system 200 including a control panel 202, which may comprise controller 102 illustrated in FIGS. 1A and 1B. Further, system 200 includes a customer device 204, which may comprise a customer's computer (e.g., handheld device, personal computer, etc.). System 200 further includes a database 206, a merchant 208, and a printer 210. Database 206 may include media, such as coupon offers, coupons, ring tones, and the like. It is noted that database 206 may exist within, for example, monitoring system 103, media system 122, or both. Further, merchant 208 may comprise an entity at which a coupon may be redeemed. System 200 may be configured to enable for redemption of a coupon in a security system.

During a contemplated operation of system 200, a customer may receive media from database 206 via control panel 202 or customer device 204. For example, a customer may retrieve, via control panel 202, coupon offers, coupons, ring tones, other media, or combinations of media, from database 206. Further, media retrieved from database 206 may be stored within control panel 202 and assigned to one or more alarm zones of an associated security system. Upon detection of an event at an alarm zone, media associated with the alarm zone and stored within alarm panel 202 may be conveyed at control panel 202. Further, a customer may search for, or "look up," available media within database 206 via customer device 204 or alarm panel 202.

In the event a customer selects a coupon offer or similar media, a message (e.g., an email message, a text message (e.g., MMS, SMS, etc.), etc.) may be sent to customer device 204. As an example, the message may include an associated coupon, other associated media, or a link for accessing the coupon or other media. Furthermore, a coupon may be redeemed or other media may be used by printing the media via printer 210 and presenting the coupon to an appropriate party (e.g., merchant 208, etc.), or by displaying the media on a screen of customer device 204 and showing the coupon to the appropriate party.

Figure 3:
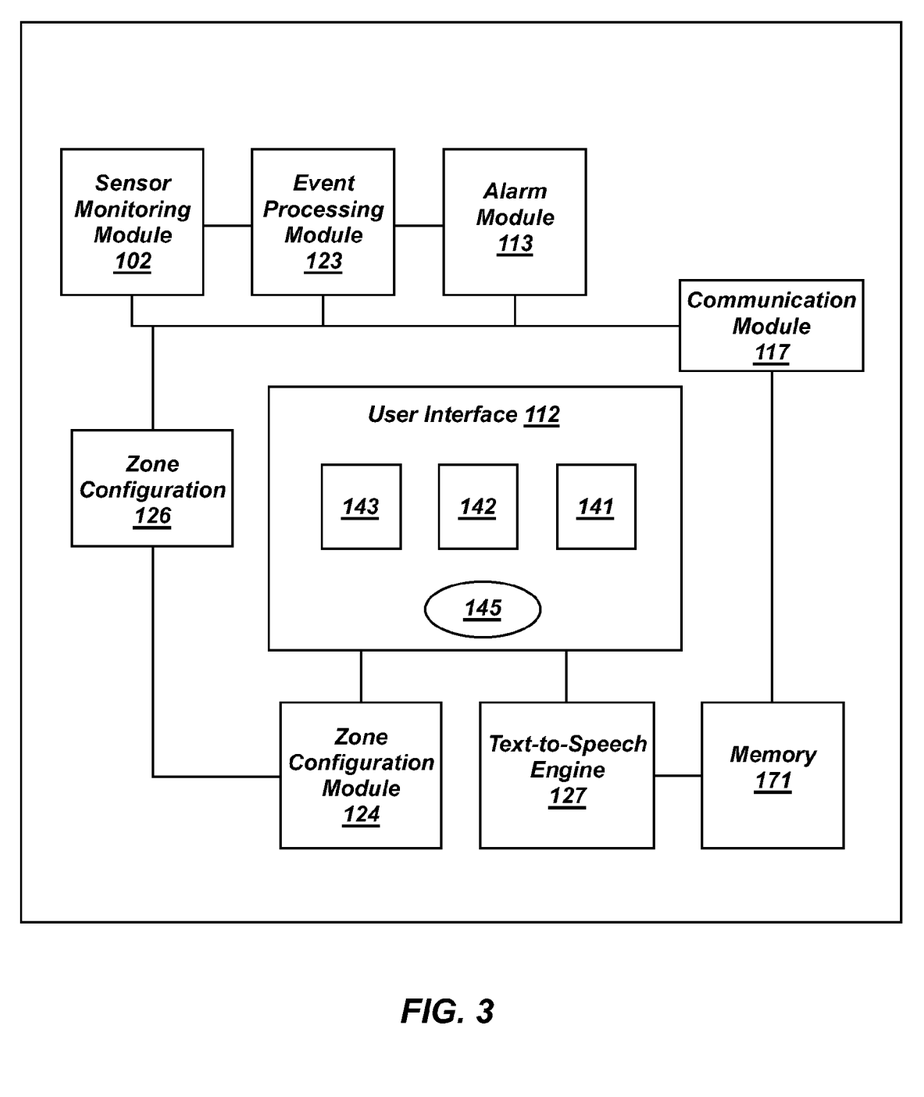
FIG. 3 illustrates an embodiment of a security system controller.

With reference to FIG. 3, another embodiment of the present disclosure will now be described. As illustrated in FIG. 3, controller 102 may include a text-to-speech engine 127, which may be configured to receive a user-entered text-based message (e.g., via keypad 142, touch screen 141, etc.) and generate one or more sound files associated with the text-based message. The one or more sound files may then be associated with an alarm zone. As will be appreciated by a person having ordinary skill in the art, a text-to-speech engine may, upon receiving raw text including symbols, numbers and abbreviations, convert the raw text into the equivalent of written-out words. Further, after assigning phonetic transcriptions to each word, text-to-speech engine 127 may divide and mark the text into prosodic units, like phrases, clauses, and sentences. Moreover, text-to-speech engine 127 may convert symbolic linguistic representations into one or more sound files, via a synthesizer (not shown).

As one example, a user may enter the text "the back door has been opened" via keypad 142 or touch screen 141. Further, the user may cause an audible representation of the text (i.e., "the back door has been opened") to be assigned to an alarm zone (e.g., an alarm zone monitoring the back door). Accordingly, upon detecting activation of the associated alarm zone (i.e., the back door being opened), controller 102 may convey the audible representation "the back door has been opened" via speaker 143.

Furthermore, according to another embodiment controller 102 may include a condenser 145, which may be configured to receive user-entered sounds (e.g., chimes, words, sentences, etc.) and convert the received sounds to one or more sound files. Upon receipt thereof, controller 102 may associate the one or more sound files with an alarm zone. As an example, a user may verbalize the phrase "the back door has been opened" into condenser 145. Further, the user may cause the entered phrase (i.e., "the back door has been opened") to be assigned to an associated alarm zone (e.g., an alarm zone monitoring the back door). Accordingly, upon detecting activation of the alarm zone (i.e., the back door being opened), controller 102 may convey the phrase "the back door has been opened" via speaker 143.

Figure 4:
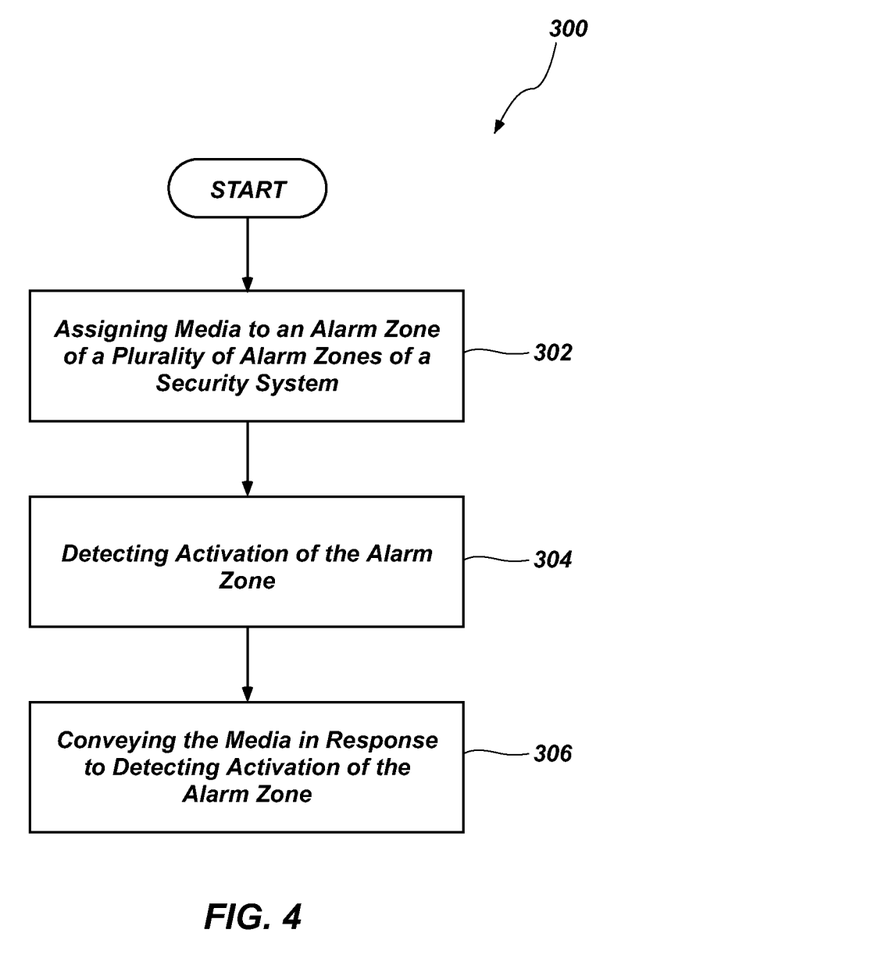
FIG. 4 is a flow chart illustrating an embodiment of a method for assigning media to a zone of a security system and using the media when activity is detected at that zone.

FIG. 4 is a flow chart illustrating a method 300, in accordance with an embodiment of the present disclosure. Method 300 will be described with reference to FIGS. 1A, 1B, 2, and 4. Method 300 may include assigning media to an alarm zone of a plurality of alarm zones of a security system (act 302). According to one embodiment, the media may comprise a ring tone, a coupon, or both. Moreover, method 300 may include detecting activation of the alarm zone (act 304). As noted above, an alarm zone may be activated upon a sensor detecting a change in physical surroundings. Further, method 300 may include conveying (i.e. presenting) the media in response to detecting activation of the alarm zone (act 306). As an example, media may be conveyed audibly, visually, or both, via user interface 112.

Figure 5:
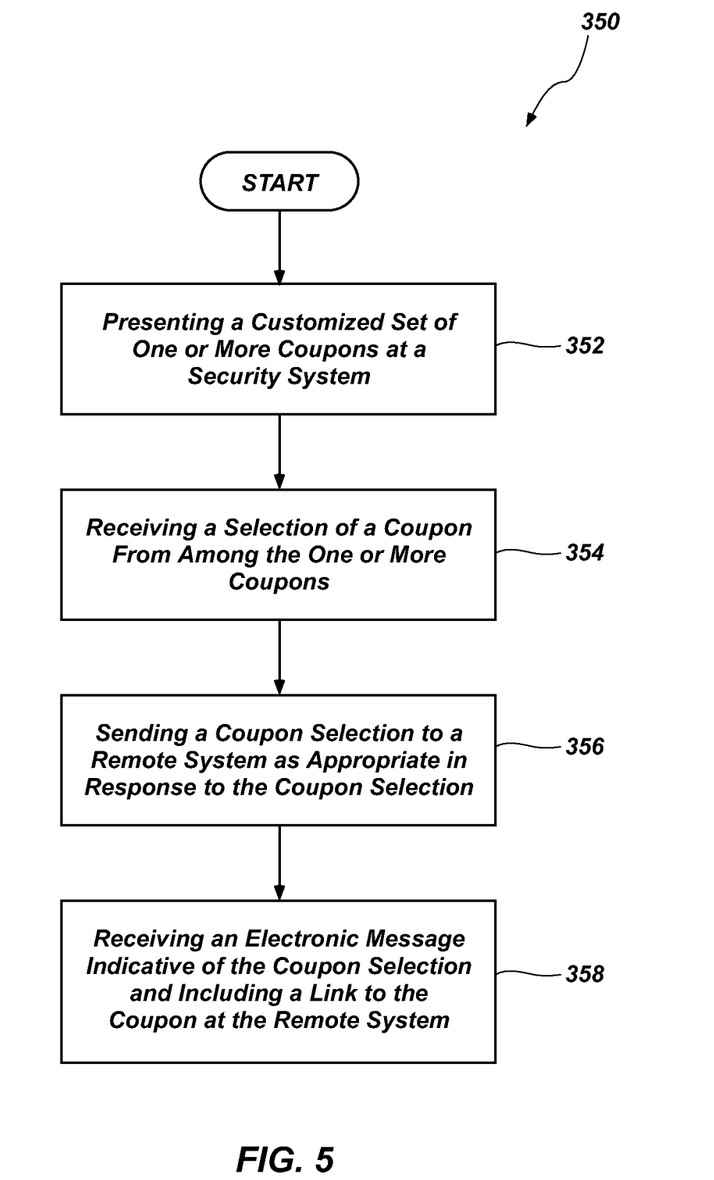
FIG. 5 is a flow chart illustrating an embodiment of another method, in which coupons are presented to a security system controller and the security system controller enables a user to select from the coupons and deliver each selected coupon.

FIG. 5 is a flow chart illustrating another method 350 for delivering and managing a coupon through a security system, according to an embodiment of the present disclosure. Method 350 will be described with reference to FIGS. 1A, 1B, 2, and 5. Method 350 includes presenting a customized set of one or more coupons at a security system (act 352). As an example, the customized set of one or more coupons, which may be received from a media system, may be presented at a user interface of a security system controller. More specifically, for example, user interface 112 can present an indication of a customized set of coupons, including a coupon offer 162 (e.g., a coupon offer for coupon 181 previously received from media system 122 or monitoring system 103), at touch screen 141. Coupons 181, including coupon offer 162, can be customized based on profile 172. Profile 172 can include information presented by a user of controller 102 to qualify for installation of the security system that includes controller 102. Presenting an offer of one or more coupons 181 can also be based on an activated zone. For example, an offer of one or more coupons 181 can be stored in zone configuration 126 associated with a zone for a particular entry door. When the particular entry door is opened, the one or more coupons associated with the zone for the entry door can be presented at touch screen 141.

Method 350 further includes receiving a selection of a coupon from among the one or more coupons (act 354). The selection of a coupon may be received at user interface 112. For example, a user can select coupon offer 162 from touch screen 141. In response, coupon selection 163 can be conveyed over communication link 121 to media system 122, monitoring system 103, or both. Method 350 also includes sending a coupon selection to a remote system in response to the coupon selection (act 356). More specifically, for example, method 350 may include sending a message indicative of the selected coupon to a remote system in response to the selection at user interface 112.

Further, method 350 includes receiving an electronic message indicative of the coupon selection and including a link to the coupon at the remote system (act 358). More specifically, electronic message 174 may include a link 175 to coupon 181 at the media system 122. Generally, an electronic message, for example, an electronic mail message, SMS text message, or MMS multi-media message, can be sent to a computing device (e.g., laptop, PDA, mobile telephone, etc) of an owner or user of controller 102 in response to receiving a coupon selection. Electronic message 174 can be sent to a pre-established identifier, such as an electronic mail alias or telephone number, of the owner/user of controller 102. The electronic (e.g., mail or SMS) message can include a link 175, such as a hyperlink, back to coupon 181 at media system 122.

For example, in response to receiving coupon selection 163, media system 122 can send electronic mail message 174 to a computing device of an owner or user of controller 102. Electronic mail message 174 includes link 175 (e.g., a hyperlink) back to coupon 181. Alternatively, in response to receiving coupon selection 163, monitoring system 103 can send electronic mail message 176 to customer device of an owner or user of controller 102. Electronic mail message 176 includes link 175 (e.g., a hyperlink) back to coupon 181.

Further, as noted above, a user may transfer coupon 181, via the link, from media system 122 to customer device 204. For example, the owner or user can use customer device 204 to access coupon 181 from media system 122. The user can select a hyperlink to initiate Internet communication to an entertainment coupon database. Thus, accessing can include accessing media system 122 over the World Wide Web or other portions of the Internet. For example, selecting link 175 can be used to access coupon 181 over the World Wide Web.

In addition, after accessing coupon 181, a user or owner can use a personal device to print coupon 181. For example, using a laptop, PDA, or phone, a user can print coupon 181 at an attached printer 210. The printed coupon 181 can then be presented to merchant 208. Alternatively, after accessing coupon 181, a user or owner may simply store or save coupon 181 on personal device 204. The stored coupon 181 can later be displayed on a screen of the personal device (e.g., a mobile computing device, such as mobile phone, a tablet computing device, or the like; etc.) for presentation to merchant 208.

Figure 6:
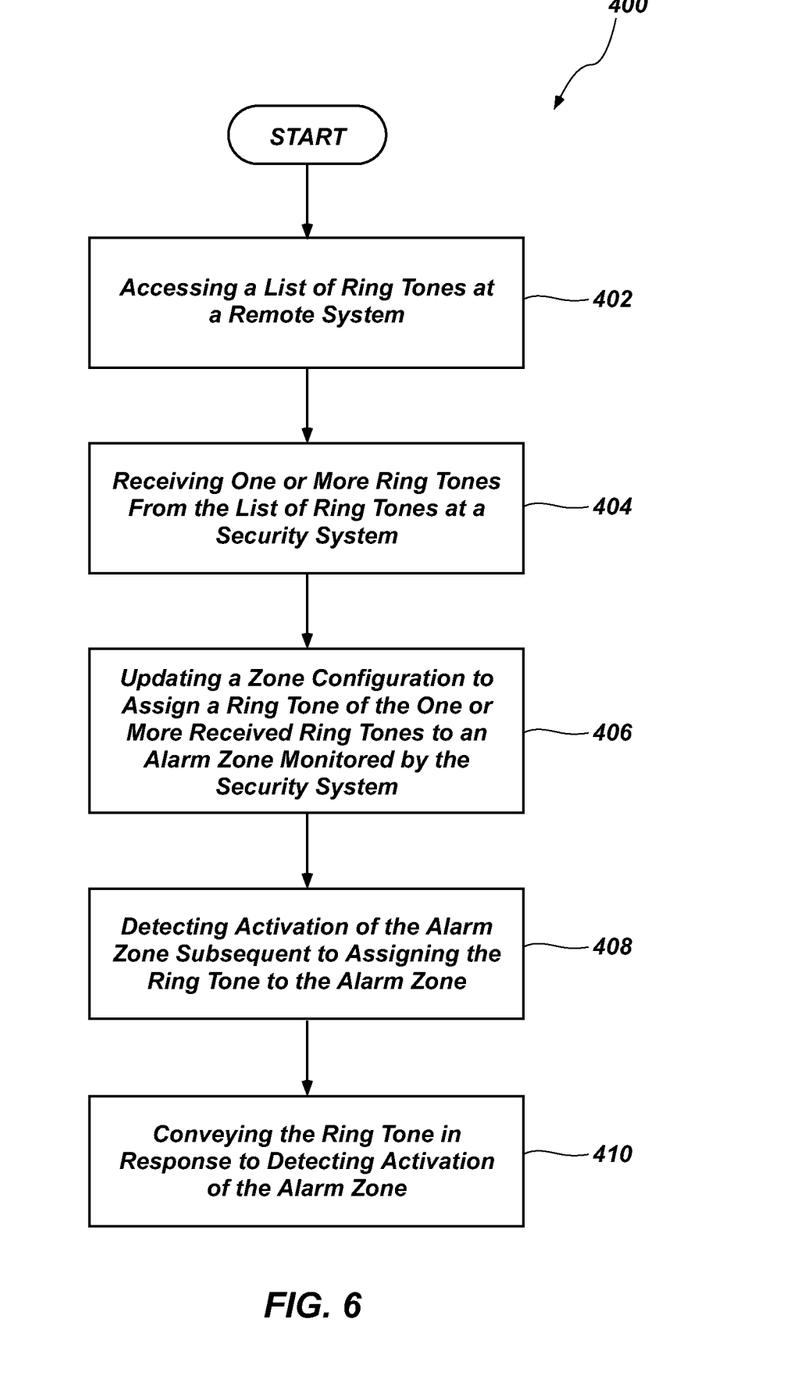
FIG. 6 is a flow chart illustrating an embodiment of a method in which audible signals, such as ring tones, are presented to a security system controller, which enables a user to select from and manage the audible signals.

FIG. 6 is a flow chart illustrating a method 400 for managing media with a security system, according to an embodiment of the present disclosure. Method 400 will be described with reference to FIGS. 1A, 1B, 2, and 6. Method 400 includes accessing a list of ring tones at a remote system (act 402). For example, a user can access, via user interface 112, a list of ring tones including ring tone 161. Method 400 also includes receiving one or more ring tones from the list of ring tones at a security system (act 404). For example, one or more ring tones including ring tone 161 can be received and stored in memory 171.

Moreover, method 400 includes updating a zone configuration to assign a ring tone of the one or more received ring tones to an alarm zone monitored by the security system (act 406). For example, a user can use user interface 112 to interact with zone configuration module 124 to update zone configuration 126. The update to zone configuration 126 can include assigning ring tone 161 to zone 1.

In addition, method 400 includes detecting activation of the alarm zone subsequent to assigning the ring tone to the alarm zone (act 408). For example, sensor monitoring module 111 can detect an open circuit for zone 1 (e.g., a door). In response, sensor monitoring module 111 can send zone activation 173 to event processing module 123. Event processing module 123 can process zone activation 173 to detect activation of zone 1. Method 400 also includes conveying the ring tone in response to detecting activation of the alarm zone (act 410). For example, in response to detecting activation of the alarm zone, event processing module 123 can submit ring tone 161 to speaker 143, which may audibly output ring tone 161.

Different alarm zones can be assigned different ring tones. For example, zone configuration 126 can also be updated to assign a different ring tone to zone 2. Thus, when activation of zone 2 is detected, the different ring tone can be audibly presented at speaker 143. Accordingly, different ring tones can be used by a user to differentiate between different alarm zones. Different ring tones can also be assigned to the same alarm zone to differentiate between alarm and non-alarm conditions.

Figure 7:
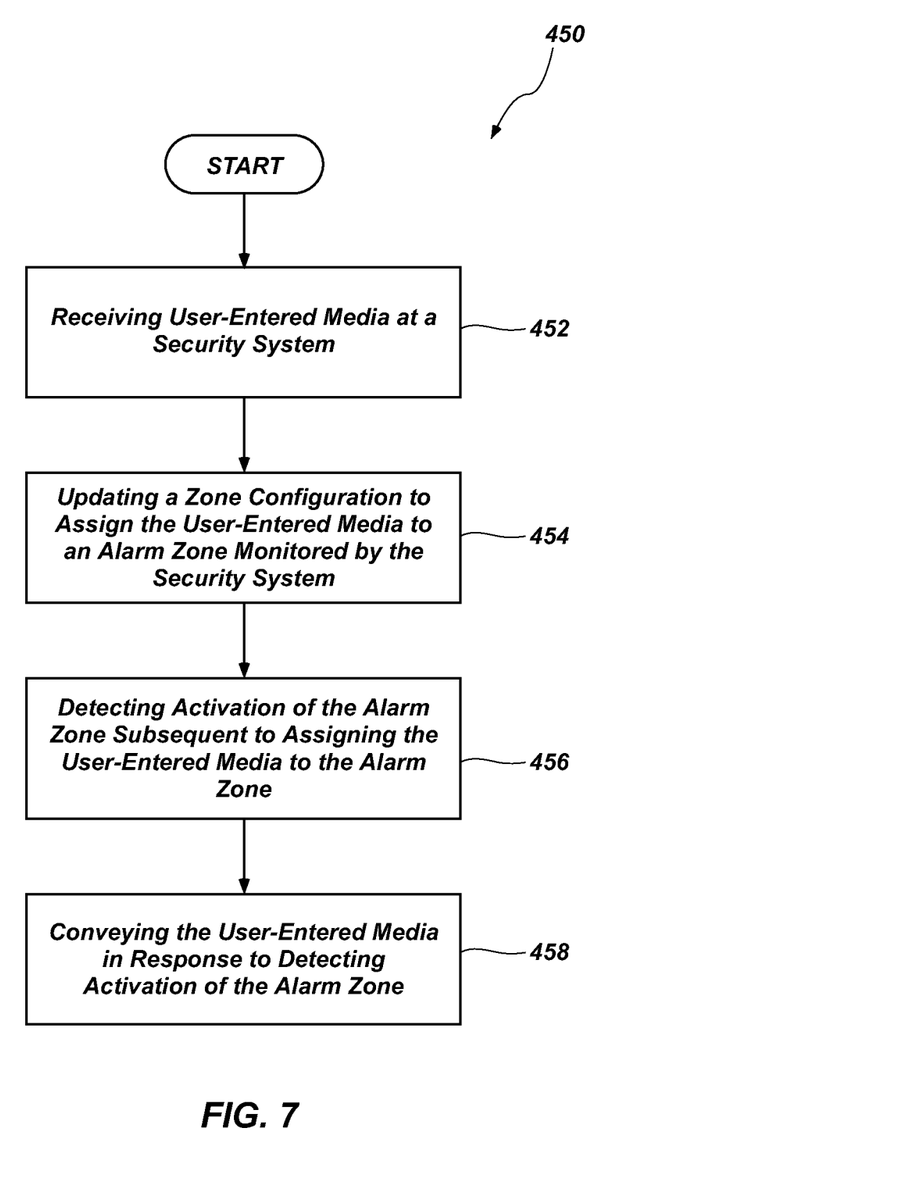
FIG. 7 is a flow chart illustrating an embodiment of a method in which a user may proactively enter media into a security system controller.

FIG. 7 is a flow chart illustrating a method 450, according to an embodiment of the present disclosure. Method 450 will be described with reference to FIGS. 1A, 1B, 3 and 7. Method 450 includes receiving user-entered media at a security system (act 452). For example, a text message, entered by a user via keypad 142 or touch screen 141, may be received at controller 102. Method 450 also includes updating a zone configuration to assign the user-entered media to an alarm zone monitored by the security system (act 454). For example, zone configuration module 124 may assign an audible representation of the user-entered media to zone configuration 126. Further, method 450 may include detecting activation of the alarm zone subsequent to assigning the user-entered media to the alarm zone (act 456). Moreover, method 450 includes conveying an audible representation of the user-entered media in response to detecting activation of the alarm zone (act 458). For example, the audible representation of the user-entered media may be conveyed via speaker 143 in response to detecting activation of the associated alarm zone.

Those of ordinary skill in the art would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the disclosed subject matter.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are may comprise part of the medium.

The preceding description of the disclosed embodiments is provided to enable any person of ordinary skill in the art to practice the disclosed subject matter. Various modifications to these embodiments will be readily apparent to those of ordinary skill in the art, and the generic principles defined herein may be applied to other embodiments without departing from the spirit or scope of the disclosure. Thus, the scopes of the claims are not intended to be limited to the embodiments disclosed herein, but are to be accorded the widest scope consistent with the principles and novel features disclosed herein.

What is claimed is:

1. A method, comprising:
   connecting a security system to a remote system via a network link;
   receiving, from the remote system, a plurality of downloadable media into the security system, wherein the received plurality of downloadable media includes at least one coupon offer;
   updating a zone configuration to assign a first one of the received plurality of downloadable media that includes a coupon offer to an alarm zone monitored by the security system;
   detecting activation of the alarm zone subsequent to assigning the first one of the received plurality of downloadable media that includes the coupon offer to the alarm zone;
   conveying, at a display of the security system, the first one of the received plurality of downloadable media that includes the coupon offer in response to detecting activation of the alarm zone;
   receiving, at the security system, a user-selection of the coupon offer; and
   receiving, at a mobile personal computing device and in response to the user-selection of the coupon offer, an electronic message that includes a link to the coupon offer at the remote system.

2. The method of claim 1, further comprising accessing the plurality of downloadable media via a user interface of a security system controller, the security system controller configured to control one or more features of the security system.

3. The method of claim 1, further comprising storing the received plurality of downloadable media that includes the at least one coupon offer in memory at a security system controller, the security system controller configured to control one or more features of the security system.

4. The method of claim 1, further comprising:
   updating the zone configuration to assign a second one of the received plurality of downloadable media from among the received plurality of downloadable media to a second alarm zone monitored by the security system,

15 the second one of the received plurality of downloadable media differing from the first one of the received plurality of downloadable media;

detecting activation of the second alarm zone subsequent to assigning the second one of the received plurality of downloadable media to the second alarm zone; and conveying the second one of the received plurality of downloadable media at the display in response to detecting activation of the second alarm zone such that different ones of the received plurality of downloadable media are used when the first and second alarm zones are activated.

5. The method of claim 1, further comprising accessing a list of downloadable media at one of a media system and a monitoring system.

6. A non-transitory computer-readable storage medium storing instructions that when executed by a processor cause the processor to perform a method, the method comprising:

connecting a security system to a remote system via a network link;

receiving, from the remote system, a plurality of downloadable media into the security system, wherein the received plurality of downloadable media includes a coupon;

updating a zone configuration to assign a first one of the received plurality of downloadable media that includes the coupon to an alarm zone monitored by the security system;

detecting activation of the alarm zone subsequent to assigning the first one of the received plurality of downloadable media that includes the coupon to the alarm zone;

conveying, at a display of the security system, the first one of the received plurality of downloadable media that includes the coupon in response to detecting activation of the alarm zone;

receiving, at the security system, a user-selection of the coupon; and receiving, at a mobile personal computing device and in response to the user-selection of the coupon offer, an electronic message that includes a link to the coupon offer at the remote system.

7. The non-transitory computer-readable storage medium of claim 6, the medium further comprising stored instructions that cause the method to further include:

updating the zone configuration to assign a second one of the received plurality of downloadable media from among the received plurality of downloadable media to a second alarm zone monitored by the security system, the second one of the received plurality of downloadable media differing from the first one of the received plurality of downloadable media;

detecting activation of the second alarm zone subsequent to assigning the second one of the received plurality of downloadable media to the second alarm zone; and conveying the second one of the received plurality of downloadable media at the display in response to detecting activation of the second alarm zone such that different ones of the received plurality of downloadable media are used when the first and second alarm zones are activated.

8. A method comprising:

presenting a customized set of one or more coupons at an interface device of a security system;

receiving, at the interface device of the security system, a user-selection of a coupon from among the one or more coupons;

16 sending information about the coupon to a remote system in response to the user-selection of the coupon; and receiving, at a mobile personal computing device and in response to the user-selection of the coupon, an electronic message that includes a link to the coupon at the remote system.

9. The method of claim 8, wherein the presenting the customized set of one or more coupons comprises presenting one or more coupons received from at least one of a remote media system and a remote monitoring system, the one or more coupons customized based on a profile of a user of the security system.

10. The method of claim 8, wherein the sending the information about the coupon to the remote system comprises sending the information about the coupon to at least one of a media system and a monitoring system.

11. The method of claim 8, further comprising transferring the coupon from the remote system to the mobile personal computing device via the link.

12. The method of claim 11, further comprising storing the coupon at the mobile personal computing device for subsequent presentation to a merchant on a display of the mobile personal computing device.

13. The method of claim 8, further comprising:

receiving the customized set of one or more coupons via wireless communication over a network prior to presenting the customized set of one or more coupons at the security system; and storing the customized set of one or more coupons in memory at the security system.

14. The method of claim 8, further comprising:

detecting activation of an alarm zone that is monitored by the security system, and wherein the presenting the customized set of one or more coupons comprises presenting the customized set of one or more coupons in response to a detected activation of the alarm zone.

15. A method, comprising:

assigning multiple media to an alarm zone of a plurality of alarm zones within a security system, wherein the multiple media are selected from a plurality of downloaded media that includes coupons;

detecting activation of the alarm zone;

conveying the media, including a first coupon, in response to detecting activation of the alarm zone;

receiving a user-selection of the first coupon; and receiving, at a mobile personal computing device and in response to the user-selection of the coupon, a link to the coupon at a remote system.

16. The method of claim 15, wherein the conveying the media comprises conveying a ring tone in response to the detected activation of the alarm zone.

17. The method of claim 15, wherein the conveying the media comprises at least one of audibly conveying the media and visually conveying the media.

18. A system, comprising:

a media system configured for transferring media, the media comprising a customizable set of one or more coupons; and a security system controller including:

a zone configuration module configured to assign coupon media to one or more alarm zones; and a user-interface configured to convey coupon media associated with an alarm zone in response to an event at the alarm zone; and a mobile personal computing device configured to access the internet;

wherein, in response to a user-selection of the coupon media from the user-interface of the security system controller, a link to the coupon media is automatically provided to the mobile personal computing device by the media system, wherein the link includes an internet address for the coupon.

19. The system of claim 18, wherein the media is customized based on a profile of a user of the security system controller.

20. The method of claim 1, further comprising sending an indication of the user-selection of the coupon offer to the remote system.

* * * * *